United States Patent [19]

Tamai et al.

[11] Patent Number: 5,880,803
[45] Date of Patent: *Mar. 9, 1999

[54] LIQUID CRYSTAL DISPLAY ELEMENT WITH A PORTION OF AN ALIGNMENT LAYER COVERS SPACER IS DIRECTLY BONDED TO THE ALIGNMENT LAYER ON THE OTHER SUBSTRATE

[75] Inventors: Kazuhiko Tamai; Mitsuhiro Koden, both of Kashiwa, Japan

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 746,005

[22] Filed: Nov. 5, 1996

[30] Foreign Application Priority Data

Nov. 6, 1995 [JP] Japan .................................. 7-287680

[51] Int. Cl.⁶ .......................... G02F 1/1333; G02F 1/141; G02F 1/1339
[52] U.S. Cl. .......................... 349/156; 349/110; 349/133
[58] Field of Search .................................. 349/110, 133, 349/156

[56] References Cited

U.S. PATENT DOCUMENTS

| 4,653,864 | 3/1987 | Baron et al. | 350/344 |
| 4,744,639 | 5/1988 | Tsuboyama | 350/350 |

FOREIGN PATENT DOCUMENTS

| 56-99384 | 8/1981 | Japan . |
| 61-173221 | 8/1986 | Japan . |
| 6-175133 | 6/1994 | Japan . |
| 06-331970 | 12/1994 | Japan . |
| 8605283 | 9/1986 | WIPO . |

OTHER PUBLICATIONS

European Search Report for Application No. 96308051.0; dated Mar. 13, 1997.

R.P. Wenz et al., SID 93 Digest, May 16, 1993, pp. 961–964, "Plastic Microstructure–Spaced LCD".

U.S. Application Serial No. 08/743,838, filed Nov. 5, 1996 in the name of Tamai et al.

U.S. Application Serial No. 08/742,922, filed Nov. 1, 1996 in the name of Koden et al.

Primary Examiner—William L. Sikes
Assistant Examiner—Julie Ngo

[57] ABSTRACT

A liquid crystal display element is provided with a first insulating substrate having spacers and an alignment layer that covers the entire surfaces of the spacers, and a second insulating substrate having at least an alignment layer. The liquid crystal display element is arranged so that the first and second insulating substrates are bonded to each other by allowing the alignment layer on the spacers of the first insulating substrate and the alignment layer on the second insulating substrate to soften and adhere to each other by applying a pressure under heat, and liquid crystal is injected into the gap in between.

14 Claims, 5 Drawing Sheets

LIQUID CRYSTAL DISPLAY ELEMENT WITH A PORTION OF AN ALIGNMENT LAYER COVERS SPACER IS DIRECTLY BONDED TO THE ALIGNMENT LAYER ON THE OTHER SUBSTRATE

FIELD OF THE INVENTION

The present invention relates to a liquid crystal display element which has a substrate structure capable of achieving a uniform cell thickness and sufficient shock resistance, as well as to a manufacturing method thereof.

BACKGROUND OF THE INVENTION

Conventionally, liquid crystal display elements, which are made by bonding paired substrates to each other with their electrode-bearing surfaces facing inside and by sealing liquid crystal into the gap between them, have been well known. In such liquid crystal displays, when the distance between the opposing substrates varies due to deformation of the substrates caused by external pressure or other adverse effects, changes in the threshold-voltage value, short circuit in the electrodes between the opposing substrates, disturbance in the orientation of the liquid crystal molecules, etc. tend to occur, thereby making it impossible to provide good display images. For this reason, in order to keep the distance between the paired substrates constant, some methods for placing spacers between the substrates have been suggested; conventionally, either of the following two methods is commonly adopted: (1) a method for spraying spherical particles and (2) a method for forming pillars made of an organic or inorganic material.

Specific examples of the method (1) include a dry method in which spherical fine particles, made of, for example, an organic resin, such as a polymer of divinylbenzenes, are dispersed in a gas flow of nitrogen and then sprayed on the substrates, and a method in which the spherical fine particles are mixed in an alcohol solution or other solutions and sprayed on the substrates in a mist state.

However, method (1) has the following problems: The first problem is that since the fine particles have a coagulating property whereby they coagulate with one another, it is difficult to spray them on the substrates in a uniform manner and consequently to achieve a uniform cell thickness. The second problem is that since it is difficult to control the adherence location of the fine particles, the particles, which have been unintentionally sprayed on pixels, tend to cause defects in the orientation, resulting in low display quality. Further, the third problem is that since the substrates are supported by the spherical fine particles that function as spacers only at their contact points, it is difficult to obtain sufficient strength against external pressure.

Moreover, method (2) more specifically refers to a method in which: an organic or inorganic film is formed with a desired thickness, a resist film is formed thereon, and the resist film is irradiated by ultraviolet lights using a photomask, thereby forming pillars that function as spacers. Here, instead of the resist film, for example, photosensitive organic resins, such as photosensitive polyimide or photosensitive acryl resins, can be adopted.

As described above, advantages of method (2) are that the pillars can be selectively formed on the outside of the pixels, and that the contact surfaces between the substrates and the pillars can be shaped into a desired pattern. Thus, method (2) is superior in the uniformity of the cell thickness, the strength against external pressure, and display quality, as compared with method (1).

Recently, ferroelectric liquid crystal has been taken notice of as a prospective liquid crystal material since it has superior properties, such as having spontaneous polarization and providing high-speed response. However, the disadvantage of ferroelectric liquid crystal is that since it has a structure whose molecule-regularity is closer to that of a crystal, once the molecular orientation has been disturbed, it is difficult to return to its original state, that is, it is susceptible to shock. For this reason, in order to solve the above-mentioned inherent problem with ferroelectric liquid crystal, it is essential to provide a substrate construction that is superior in shock resistance. In order to provide a method for manufacturing such a liquid crystal display element, method (2) is considered to be a more prospective candidate than method (1).

In general, in the conventional manufacturing method (2), after an alignment layer has been formed on an insulating substrate, spacers are formed on the alignment layer. However, the conventional manufacturing methods have the following various problems.

First, the manufacturing process of the spacers may give adverse effects, such as contamination, deterioration, and damage, on the alignment layer. Conventionally, in general, spacers are formed on a substrate that has been subjected to an alignment process, by using a photolithography process wherein photosensitive polyimide, photoresist and other materials are used. Here, solvents, which are used in the photolithography process, tend to give adverse effects on the alignment layer. In this case, since the alignment capability of the alignment layer is lowered, the orientation of liquid crystal molecules becomes ununiform, thereby causing degradation in the display quality.

Moreover, when consideration is given so that spacer materials do not affect the alignment layer, limitations, such as a limitation that spacer materials having a setting temperature higher than the alignment layer can not be used, have to be imposed on the spacer materials.

Furthermore, in the above-mentioned conventional manufacturing method, when the substrates are bonded to each other, the spacers that have been formed on one of the substrates and the alignment layer that has been formed on the opposing substrate are bonded to each other. Here, such a bonding process between the materials of different types raises the following problems: The bonding process is carried out while both of the spacers and the alignment layer are being softened by applying heat under pressure; therefore, when there is a great difference between the respective softening temperatures of the spacers and the alignment layer, the material having the lower softening temperature may not retain its shape upon having a temperature rise to the higher softening temperature. Consequently, for example, if the spacers are deformed, those spacers may enter the pixel portions, thereby causing problems, such as degradation in the display quality and low precision in the cell-thickness control. In contrast, if a sufficient temperature rise is not provided, a sufficient adhesive strength may not be obtained, thereby making the substrates susceptible to deformation under external pressure.

SUMMARY OF THE INVENTION

The objective of the present invention is to provide a liquid crystal display element which has a uniform cell thickness and a sufficient shock resistance so that it can achieve good display quality without nonuniformity.

In order to achieve the above-mentioned objective, the liquid crystal display element of the present invention, which has a pair of substrates at least one of which has a light-transmitting property, liquid crystal, alignment layers that are respectively formed on the pair of the substrates, and a spacer that is formed on at least one of the pair of the substrates, is designed so that: the alignment layer is formed so as to cover at least the spacer on the surface of the substrate; and a portion of the alignment layer, which is located on the spacer, is bonded to the alignment layer on the other substrate.

In the above-mentioned arrangement, the paired substrates are bonded to each other by the adhesion between the two alignment layers. For this reason, it is possible to easily control the applications of heat and pressure during the bonding process, thereby making the cell thickness uniform, as well as improving the adhesive strength. In other words, it becomes possible to avoid adverse effects, such as deformation of either of the materials due to applications of unnecessarily high heat and pressure and insufficient adhesive strength due to applications of insufficient heat and pressure, which conventionally tend to occur, when the spacer on one of the substrates and the alignment layer on the other substrate are bonded to each other. Thus, it becomes possible to provide a liquid crystal display element which has superior shock resistance and can achieve good display quality without nonuniformity.

Moreover, in the liquid crystal display element, when the liquid crystal is made of ferroelectric liquid crystal, it is possible to provide a further high-resolution display, since high-speed response is available that is one of the superior properties of ferroelectric liquid crystal. Here, ferroelectric liquid crystal has a higher ordered molecular orientation that is closer to crystal, for example, as compared with nematic liquid crystal. Therefore, the disadvantage of ferroelectric liquid crystal is that, once the molecular orientation has been disturbed due to external pressure, it is difficult to return to its original state, that is, it is susceptible to shock. However, the above-mentioned arrangement, which has an improved substrate strength, can eliminate this disadvantage. Thus, it is possible to achieve a liquid crystal display element which allows the ferroelectric liquid crystal to exhibit its superior properties.

In order to achieve the aforementioned objective, the manufacturing method of a liquid crystal display element of the present invention is provided with the steps of forming a spacer on an insulating substrate and forming an alignment layer in a manner so as to cover the spacer.

In the above-mentioned manufacturing method, a spacer is first formed on an insulating substrate. Here, before or after this process, members, such as electrodes, a light-shielding film, or an insulating film, may be formed on the insulating substrate, if necessary. Thereafter, an alignment layer is formed in a manner so as to cover the spacer. As described above, since the spacer is formed prior to the formation of the alignment layer, it is possible to prevent the alignment layer from being contaminated or damaged by solvents or other materials that are used in the spacer-forming process. With this arrangement, it is possible to provide a liquid crystal display element which can achieve good display quality without nonuniformity. Moreover, in the case when the spacer and alignment layer are formed by a baking process, this arrangement makes it possible to use spacer materials such as those require a baking temperature higher than that of the alignment layer.

For a fuller understanding of the nature and advantages of the invention, reference should be made to the ensuing detailed description taken in conjunction with the accompanying drawings.

DESCRIPTION OF THE EMBODIMENTS

Embodiment 1

Figure 1:
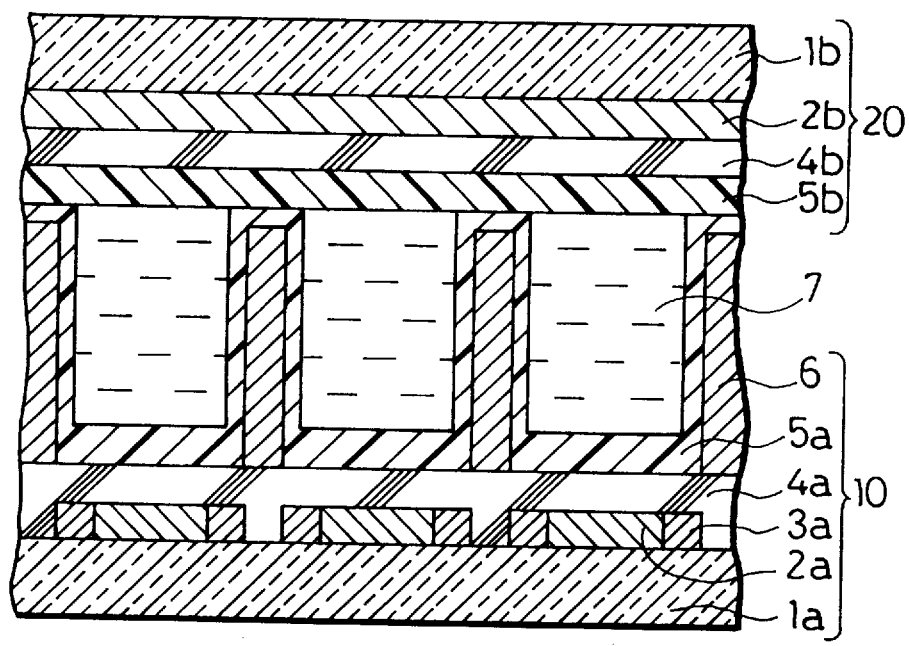
FIG. 1 is a cross-sectional view that shows a schematic construction of a liquid crystal display element of one embodiment of the present invention.

Referring to FIGS. 1 and 2, the following description will discuss one embodiment of the present invention.

FIG. 1 is a cross-sectional view that shows a schematic construction of a liquid crystal display element of one embodiment of the present invention. The liquid crystal display element is constituted by a pair of substrates 10 and 20 that are joined face to face with each other and liquid crystal 7 that is sealed in the gap in between.

The substrate 10 is constituted by an insulating substrate 1a, a plurality of electrodes 2a that are placed in parallel with one another, light-shielding films 3a, an insulating film 4a that is formed in a manner so as to cover the insulating substrate 1a, the electrodes 2a and the light-shielding films 3a, spacers 6 that are formed on the surface of the insulating film 4a, and an alignment layer 5a that is formed in a manner so as to cover the surfaces of the insulating film 4a and the spacers 6.

Further, the substrate 20 is constituted by an insulating substrate 1b, a plurality of electrodes 2b that are placed in parallel with one another, an insulating film 4b, and an alignment layer 5b that is formed on the surface of the insulating layer 4b.

The insulating substrates 1a and 1b are made of a transparent material such as glass or plastic. Further, transparent electrodes made of ITO (Indium Tin Oxide) are generally used as the electrodes 2a and 2b. However, the electrodes may be constituted by using other metals. Moreover, the light-shielding films 3a are made of metals, such as Cr, Mo and Al, opaque organic resins or other materials.

In this embodiment, a ferroelectric liquid crystal is used as the liquid crystal 7. Since ferroelectric liquid crystal has superior properties such as high-speed response and bistability, it becomes possible to display high-resolution images with a large capacity.

Figure 2A:
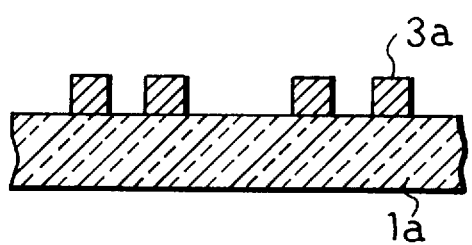
FIGS. 2(a) through 2(e) are cross-sectional views that show respective stages of a manufacturing process of the liquid crystal display element.

The present liquid crystal display element having the above-mentioned arrangement is manufactured by the following processes. First, a film with a thickness of approximately 100 nm is formed on the surface of the insulating substrate 1a by using a metal such as molybdenum or an opaque organic resin, and this film is patterned by the photolithography so as to form light-shielding films 3a with a desired pattern, as shown in FIG. 2(a).

Figure 2B:
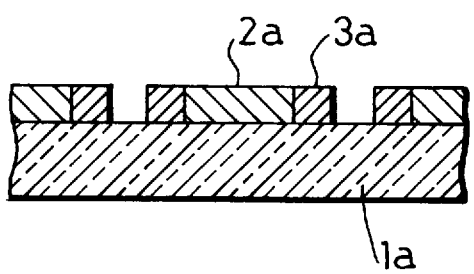

Next, an ITO film with a film thickness of approximately 100 nm is formed on the insulating substrate 1a by the sputtering method, and this film is patterned by the photolithography so as to form electrodes 2a. The resulting shape is shown in FIG. 2(b), wherein the light-shielding films 3a are placed along both sides of each electrode 2a.

Figure 2C:
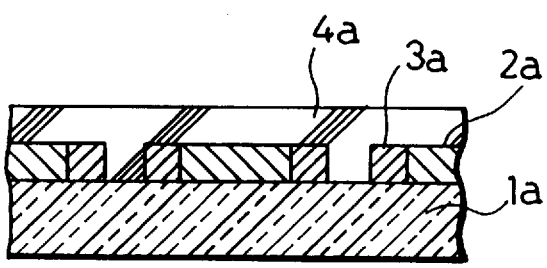

Further, to this is applied SiO$_2$ by the spin coating method so as to form an insulating film 4a having a uniform surface, as illustrated in FIG. 2(c). Here, this insulating film 4a may be omitted depending on cases.

Figure 2D:
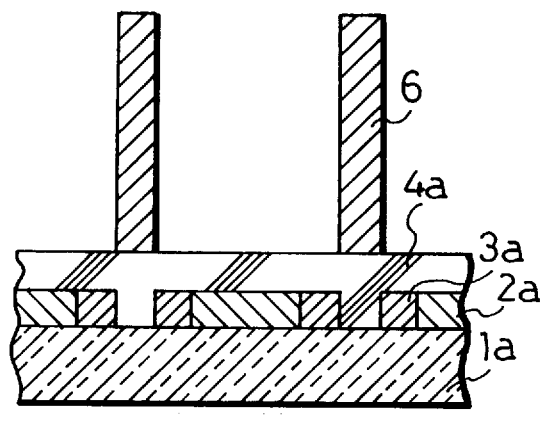

Onto the insulating film 4a is applied negative-working photoresist, such as OMR-83 manufactured by Tokyo Ohka Kogyo Co., Ltd., by the spin coating method so that it has a film thickness of 1.5 μm after a baking process. Next, the photoresist is irradiated with ultraviolet light by using a photomask only at portions thereof in which spacers are to be formed within regions that are located between the light-shielding films 3a and that have no electrodes 2a. Thereafter, non-exposed portions are removed, and as illustrated in FIG. 2(d), spacers 6 are formed by carrying out a baking process at approximately 145° C. for 30 minutes. Additionally, the spacers 6 are formed to have a desired shape, such as a column shape, wall shape or striped shape, by changing the pattern and location of the photomask in various manners.

Figure 2E:
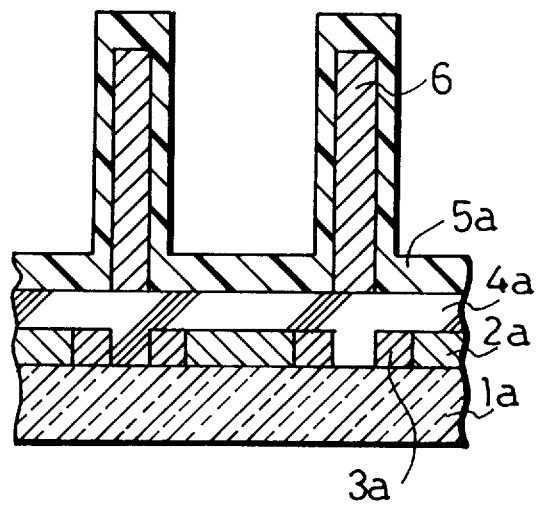

Next, PSI-A-2101, manufactured by Chisso Corporation, is formed thereto so as to have a film thickness of 50 nm, and after this has been subjected to a pre-baking process at approximately 180° C. for one hour, a rubbing process is applied to the surface thereof so as to form an alignment layer 5a as illustrated in FIG. 2(e).

The substrate 10 is manufactured by the above-mentioned processes. Further, the substrate 20 is manufactured as follows: electrodes 2b, light-shielding films, not shown, and an insulating film 4b are successively formed on an insulating substrate 1b through the same processes as described above, and an alignment layer 5b is formed on the insulating film 4b.

Next, the substrates 10 and 20 are aligned face to face with each other so that their alignment layers 5a and 5b have the same rubbing directions, and the alignment layers films 5a and 5b are bonded to each other by applying a pressure of 0.6 kg/cm$^2$ at approximately 200° C. for one hour. Further, liquid crystal 7 is sealed in the gap between the substrates 10 and 20; thus, a liquid crystal display element is formed.

The liquid crystal display element, manufactured by the above-mentioned processes, is allowed to have a uniform cell thickness with a precision within ±0.3 μm. Further, since the vicinity of the spacers 6 is shielded by the light-shielding films 3a and light-shielding films (not shown) on the substrate 20, uniform orientation and switching characteristics are obtained in the pixel display sections.

Here, with respect to the material of spacers 6, organic resins, such as polyimide and acryl resin, and metals, such as Cr, Mo, Al, may be adopted in addition to the above-mentioned negative-working photoresist. Moreover, with respect to the formation of the spacers 6, they may be formed at any region on the insulating substrate 1a; however, it is preferable to form them at the other regions except for the pixel display regions so as not to deteriorate the display quality.

Additionally, the above description exemplifies an arrangement wherein the spacers 6 are formed only on the substrate 10; however, necessary spacers 6 may be formed on the respective substrates 10 and 20 in a separated manner, and the substrates 10 and 20 may be bonded to each other by allowing the alignment layer formed on the spacers 6 on one of the substrates 10 and 20 to adhere to the alignment layer located at regions without spacers on the other substrate.

Moreover, the insulating films 4a and 4b are not necessarily required, and they can be omitted as long as no leakage current appears between the substrates 10 and 20.

Furthermore, in addition to the above-mentioned various films, an overcoat film and other films may be formed on demand.

As described above, in the liquid crystal display element of Embodiment 1, a pair of substrates 10 and 20 are provided, and one of the substrate 10 is designed as follows: after electrodes 2a and light-shielding films 3a and, if necessary, an insulating film 4a and other films have been formed on an insulating substrate 1a, spacers 6 are formed on these films, and then an alignment layer 5a is formed in a manner so as to cover the entire surface of the insulating substrate 1a including the spacers 6. The other substrate 20 is designed as follows: after electrodes 2b and, if necessary, an insulating film 4b have been formed on an insulating substrate 1b, an alignment layer 5b is formed in a manner so as to cover the entire surface of the insulating substrate 1b.

Further, the substrates 10 and 20 are bonded to each other by allowing the alignment layers 5a and 5b, both made of the same material, to be softened and to adhere to each other by applying heat and pressure. Here, the spacers 6 are not softened even in this heat and pressure applying process; therefore, different from conventional arrangements, it is possible to prevent the substrate gap from becoming ununiform due to softening and deformation of the spacers, and consequently to control the gap between the substrates 10 and 20 with high precision.

Moreover, since the paired substrates are bonded to each other by adhesion between the same materials, it is possible to avoid adverse effects, such as deformation or deterioration in one of the materials and insufficient adhesive strength, which tend to occur in adhesion between different materials, such as adhesion between conventional alignment layer and spacers. In other words, it is possible to easily control the applications of heat and pressure during the bonding process, thereby making the cell thickness uniform, as compared with the adhesion between different materials. Further, it is possible to further improve the adhesive strength. Consequently, it becomes possible to provide a liquid crystal display element which can achieve good display quality without nonuniformity and which has superior shock resistance.

Moreover, when the spacers 6 are made of a material having an optically isotropic property, that is, a material having no anisotropy in its refractive index, and when the alignment layer 5a on the spacers 6 is completely bonded to the alignment layer 5b on the opposing substrate 20 without a gap, the spacers 6 are allowed to extinct when seen through crossed Nicol-prisms. In other words, under the above conditions, since the spacers 6 also function as a black matrix, they shield the other portions except for the pixel display regions from light, thereby making it possible to improve the contrast.

Furthermore, as clearly indicated by FIG. 1, the liquid crystal 7 only contacts the alignment layers 5a and 5b, and is not allowed to contact the spacers 6. In conventional liquid crystal display elements wherein the spacers are in contact with the liquid crystal, the orientation and switching characteristics of the liquid crystal tend to become ununiform due to the spacers, resulting in nonuniformity in display. However, in the arrangement of the present Embodiment 1, since the liquid crystal 7 does not contact the spacers 6, its orientated state and switching characteristics are not adversely affected by the spacers 6; thus, it becomes possible to achieve a good display state without nonuniformity. Further, the vicinity of the spacers 6 in the pixel display regions is shielded by the light-shielding films 3a; therefore, even if slight display nonuniformity occurs, the nonuniformity hardly gives adverse effects on the actual display state, thereby making it possible to provide high display quality.

Moreover, in the arrangement of the present embodiment, the substrate construction having superior shock resistance protects the liquid crystal 7 from external pressure. In other words, even when ferroelectric liquid crystal is used as the liquid crystal 7, it is possible to eliminate the inherent disadvantage of the ferroelectric liquid crystal, that is, the susceptibility to external pressure. The resulting effect is that a liquid crystal display which allows for high-resolution image display with a large capacity by using ferroelectric liquid crystal can be put into practical use.

Furthermore, since the spacers 6 are formed prior to the formation of the alignment layer 5a, it is possible to prevent the alignment layer 5a from being contaminated or damaged by solvents or other materials that are used in the process for forming the spacers 6. Consequently, it is possible to provide a liquid crystal display element which can achieve good display quality without nonuniformity.

Embodiment 2

Figure 3:
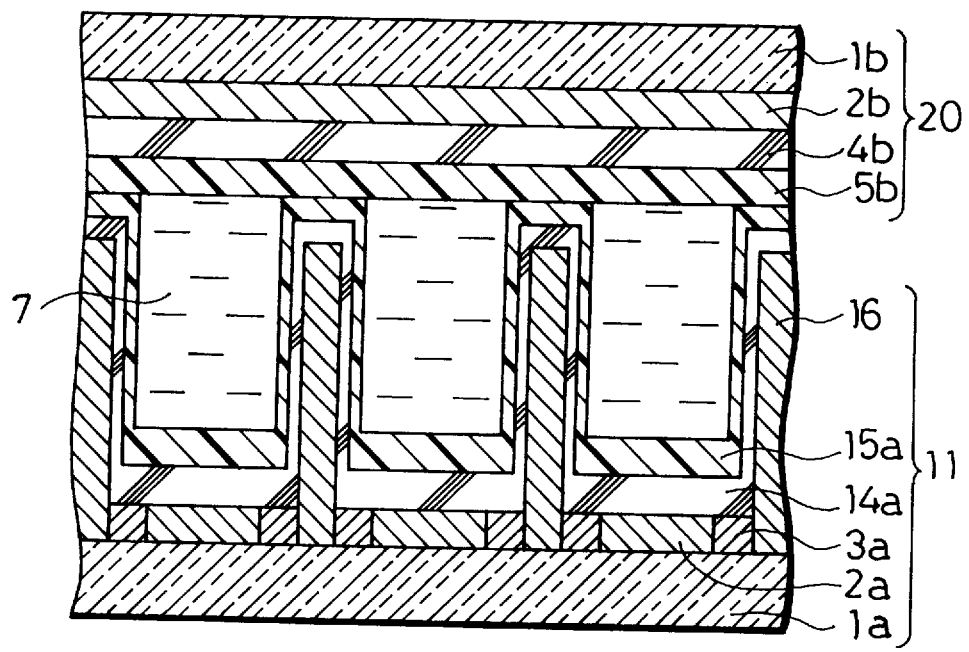
FIG. 3 is a cross-sectional view that shows a schematic construction of a liquid crystal display element of another embodiment of the present invention.

Referring mainly to FIGS. 3 and 4, the following description will discuss another embodiment of the present invention. Here, those members that have the same functions and that are described in the aforementioned embodiment are indicated by the same reference numerals and the detailed description thereof is omitted.

FIG. 3 is a cross-sectional view showing a schematic construction of a liquid crystal display element of another embodiment of the present invention. The liquid crystal display element that was described in the aforementioned Embodiment 1 has an arrangement wherein the spacers 6 are formed on the insulating film 4a and the alignment layer 5a is formed in a manner so as to cover the surfaces of the insulating film 4a and the spacers 6. Here, the liquid crystal display element of Embodiment 2 has an arrangement wherein a substrate 11, shown in FIG. 3, is constituted as follows: spacers 16 are formed at portions on the surface of an insulating substrate 1a where neither electrodes 2a nor light-shielding films 3a are formed, and an insulating film 14a and an alignment layer 15a are successively formed in a manner so as to cover the electrodes 2a, the light-shielding films 3a and the spacers 16.

Figure 4A:
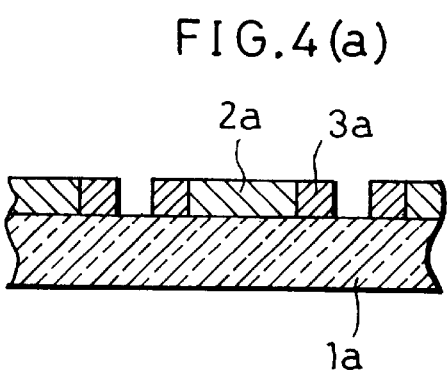
FIGS. 4(a) through 4(d) are cross-sectional view that show respective stages of a manufacturing process of the liquid crystal display element of FIG. 3.

The liquid crystal display element having the above-mentioned arrangement is manufactured by the following processes: First, the electrodes 2a and the light-shielding films 3a are formed on the surface of the insulating substrate 1a through the processes as illustrated in FIGS. 2(a) and 2(b) in the aforementioned embodiment 1. FIG. 4(a) shows a state at the time when these processes have been completed.

Next, onto the insulating substrate 1a on which the electrodes 2a and the light-shielding films 3a have been formed is applied a photosensitive organic resin, such as, for example, UR-3100 manufactured by Toray Industries Inc., by the spin coating method. Here, in this application process, the film thickness is adjusted so that it is set at 1.5 μm after a baking process. Successively, the photosensitive resin is irradiated with ultraviolet light by using a photomask only at portions thereof in which spacers are to be formed within regions that have no electrodes 2a and that are located between the light-shielding films 3a. Thereafter, non-exposed portions are removed, and a baking process is carried out at approximately 300° C. for 1 hour; thus, spacers 16 are formed as illustrated in FIG. 4(b). Additionally, in this case also, as described in the aforementioned Embodiment 1, spacers 16 is formed to have a desired shape, such as a column shape, wall shape or striped shape, by changing the pattern and location of the photomask in various manners.

Figure 4C:
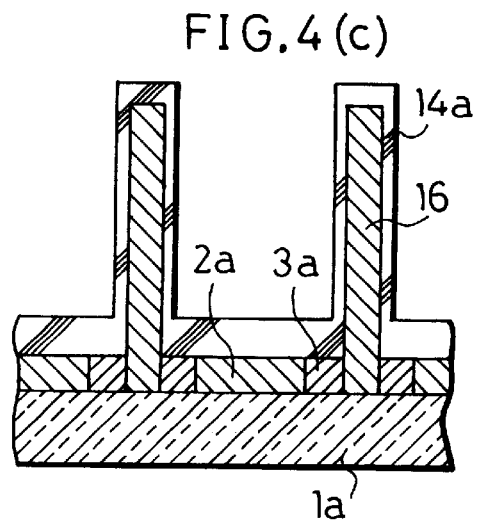
Figure 4B:
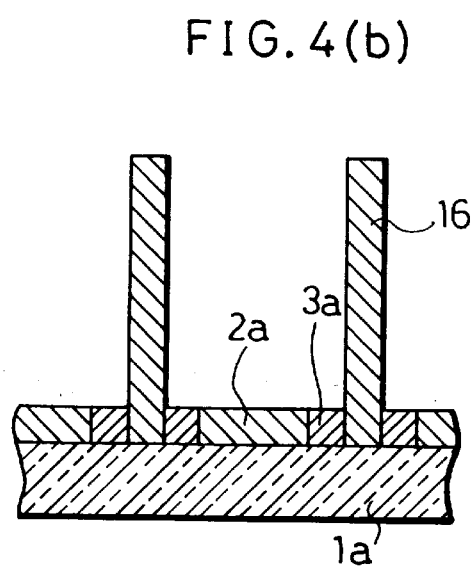
Figure 4D:
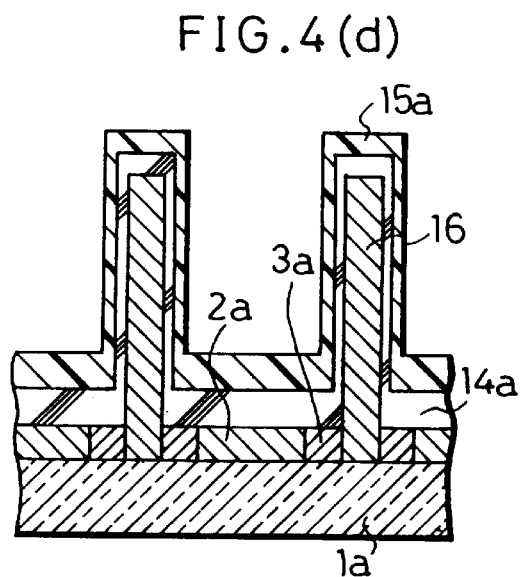

Next, SiO$_2$ is applied onto the surfaces of the electrodes 2a, the light-shielding films 3a and the spacers 16 by the spin coating method; thus, an insulating film 14a is formed as illustrated in FIG. 4(c). Further, polyimide (PSI-A-2101, manufactured by Chisso Corporation) is applied onto the insulating film 14a so as to have a film thickness of 50 nm, and after this has been subjected to a pre-baking process at approximately 180° C. for one hour, a rubbing process is applied to the surface thereof so as to form an alignment layer 15a as illustrated in FIG. 4(d). The substrate 11 is manufactured by the above-mentioned processes.

Next, the substrates 11 and 20 are bonded to each other in the same manner as the aforementioned Embodiment 1, and liquid crystal 7 is sealed into the gap between them; thus, a liquid crystal display element is formed.

As described above, the liquid crystal display element of the present embodiment is distinct from that of the aforementioned Embodiment 1 in that the insulating film, which was formed in the process prior to the spacer-forming process in the aforementioned Embodiment 1, is formed in a process succeeding to the spacer-forming process. However, with respect to the operation wherein the alignment layer 15a is formed in a process after the formation of the spacers 16, and to the operation wherein the substrates 11 and 20 are bonded to each other by allowing the alignment layers 15a and 5b, both made of the same material, to be softened and to adhere to each other by applying heat and pressure, these operations are carried out in the same manner as the aforementioned Embodiment 1. With this arrangement, it is possible to make the cell thickness uniform with higher precision compared with conventional arrangements, and also to improve the adhesive strength of the substrates 11 and 20. Consequently, it becomes possible to provide a liquid crystal display element which can achieve good display quality without nonuniformity and has superior shock resistance.

Here, a liquid crystal display element which was manufactured by conventional processes is taken as a comparative example, and is compared with the above-mentioned liquid crystal display elements of the present invention.

Figure 5:
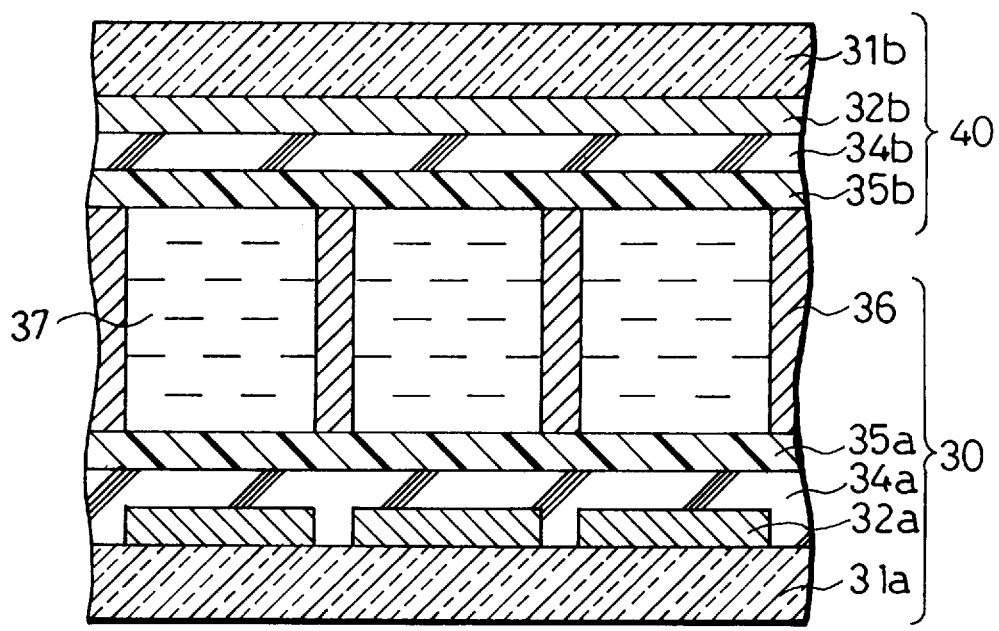
FIG. 5 is a cross-sectional view that shows a schematic construction of a liquid crystal display element that was manufactured by a conventional manufacturing process.

As illustrated in FIG. 5, the conventional liquid crystal display element has an arrangement wherein after an alignment layer 35a has been formed, spacers 36 are formed on the alignment layer 35a. The manufacturing processes of the conventional liquid crystal display element are as follows:

First, ITO was formed on an insulating substrate 31a by the sputtering method as a film with a thickness of 100 nm, and this was patterned by the photolithography so as to form transparent electrodes 32a. Next, SiO$_2$ was applied onto the electrodes 32a by the spin coating method so as to form an insulating film 34a. Further, polyimide (PSI-A-2101, manufactured by Chisso Corporation) was applied onto the insulating film 34a so as to have a film thickness of 50 nm, and after this had been subjected to a baking process at approximately 200° C. for one hour, an alignment layer 35a was formed.

Next, onto the alignment layer 35a, is applied photosensitive organic resin (UR-3100 manufactured by Toray Industries Inc.) by the spin coating method. Here, upon the application process, the film thickness was adjusted so that it was set to 1.5 μm after a baking process. Next, after a photomask had been placed at portions at which no electrodes 2a were formed, this was irradiated with ultraviolet light, and the non-exposed portions were removed. Furthermore, this was subjected to a baking process at approximately 300° C. for one hour; thus, spacers 36 were formed.

After the formation of the spacers 36, the alignment layer 35a was subjected to a rubbing process; thus, a substrate 30 was completed. Further, the substrate 40 was formed by successively forming electrodes 32b, an insulating film 34b and an alignment layer 35b on the insulating substrate 31b in the same manner as described above.

Next, the substrates 30 and 40 were bonded to each other with the same rubbing directions, and the upper surface of the spacers 36 and the surface of the alignment layer 35b were allowed to adhere each other by applying a pressure of 0.6 kg/cm$^2$ at approximately 350° C. for one hour. Further, liquid crystal 37 was sealed in the gap in between; thus, a liquid crystal display element was formed.

When comparisons were made between the liquid crystal display element that was made by the above-mentioned conventional processes and liquid crystal display elements of the aforementioned Embodiments, it was found that the liquid crystal display elements of the aforementioned Embodiments were superior in both the uniformity of the cell thickness and the adhesive strength of the substrates.

The present invention is not intended to be limited by the aforementioned Embodiments, and various modifications are available within the scope of the present invention. For example, in the above-mentioned examples, transparent glass or plastic substrates are used as the insulating substrates 1a and 1b; however, any substrates may be adopted as long as at least one substrate has a light-transmitting property. Further, the liquid crystal 7 is not intended to be limited to ferroelectric liquid crystal, and various liquid crystal material may be adopted.

Moreover, another method may be adopted, wherein only a pre-baking process is carried out when alignment layers are respectively formed on the paired substrates and when these substrates are bonded to each other, a baking process is carried out with pressure and heat being applied thereto. This method also makes it possible to provide liquid crystal display elements which are superior in both the uniformity of the cell thickness and the adhesive strength of the substrates.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element comprising:
   a pair of substrates at least one of which has a light-transmitting property;
   alignment layers that are respectively formed on the pair of the substrates; and
   a spacer that is formed on at least one of the pair of the substrates,
   wherein: the alignment layer is formed so as to cover at least the spacer on the surface of the substrate; and a portion of the alignment layer, which is located on the spacer, is directly bonded to the alignment layer on the other substrate.

2. The liquid crystal display element as defined in claim 1, wherein the liquid crystal is ferroelectric liquid crystal.

3. The liquid crystal display element as defined in claim 1, wherein the spacer has a wall shape.

4. The liquid crystal display element as defined in claim 1, wherein the spacer has a column shape.

5. The liquid crystal display element as defined in claim 1, wherein the spacer is formed outside of pixel regions.

6. The liquid crystal display element as defined in claim 1, further comprising light-shielding films for shielding the vicinity of the spacer from light.

7. The liquid crystal display element as defined in claim 1, wherein the spacer is made of a material including an organic resin.

8. The liquid crystal display element as defined in claim 1, wherein the spacer is made of a material including photoresist.

9. The liquid crystal display element as defined in claim 1, wherein the alignment layers, which are respectively formed on the pair of the substrates, are made of the same material.

10. A liquid crystal display element comprising:
    a pair of substrates at least one of which has a light-transmitting property;
    alignment layers that are respectively formed on the pair of the substrates; and
    a spacer that is formed on at least one of the pair of substrates, wherein the spacer is made of metal,
    wherein: the alignment layer is formed so as to cover at least the spacer on the surface of the substrate; and a portion of the alignment layer, which is located on the spacer, is directly bonded to the alignment layer on the other substrate.

11. A liquid crystal display element comprising:
    a pair of substrates at least one of which has a light-transmitting property;
    alignment layers that are respectively formed on the pair of the substrates; and
    a spacer that is formed on at least one of the pair of substrates, wherein the spacer has a light-shielding property,
    wherein: the alignment layer is formed so as to cover at least the spacer on the surface of the substrate; and a portion of the alignment layer, which is located on the spacer, is directly bonded to the alignment layer on the other substrate.

12. A liquid crystal display element comprising:
    a pair of substrates at least one of which has a light-transmitting property;
    alignment layers that are respectively formed on the pair of the substrates; and
    a spacer that is formed on at least one of the pair of substrates, wherein the spacer has an optically isotropic property,
    wherein: the alignment layer is formed so as to cover at least the spacer on the surface of the substrate; and a portion of the alignment layer, which is located on the spacer, is directly bonded to the alignment layer on the other substrate.

13. The liquid crystal display element as defined in claim 1, further comprising an insulating film that covers entire surface of the spacer, wherein the alignment layer is formed in a manner so as to cover the insulating film.

14. A liquid crystal display element comprising:
    a pair of substrates at least one of which has a light-transmitting property;
    alignment layers that are respectively formed on the pair of the substrates; and
    a spacer that is formed on at least one of the pair of the substrates,
    wherein: the alignment layer is formed so as to cover at least the spacer on the surface of the substrate; a softening temperature of the alignment layer is lower than that of the spacer; and a portion of the alignment layer, which is located on the spacer, is directly bonded to the alignment layer on the other substrate.

* * * * *